UNITED STATES PATENT OFFICE.

ISAAC GATTMAN, OF PHILADELPHIA, PENNSYLVANIA.

COMPOUND WHEREWITH TO MANUFACTURE PAINT.

Specification forming part of Letters Patent No. 15,806, dated September 30, 1856.

*To all whom it may concern:*

Be it known that I, ISAAC GATTMAN, of the city of Philadelphia, and State of Pennsylvania, have invented a new Composition Wherewith to Manufacture Paints; and I do hereby declare that the following is a full, clear, and exact description of the same.

My invention consists in manufacturing paints by grinding the dry or crude colors in a liquid composed of water, flour or its equivalent, linseed-oil or fish-oil, or any other of the common undrying or fatty oils, and rosin, in the proportions and manner fully set forth hereinafter, in order that the paints thus manufactured may be afterward thinned to the consistency required by simply adding the requisite quantity of water, the object of my invention being to produce paints of a durable quality, easily spread, and at a much less cost than paints prepared by grinding crude colors with linseed or other drying oils.

In compounding the liquid for grinding colors I first prepare a paste by mixing one hundred pounds of flour in fifty gallons of cold water, and then add to the same a solution of fifty pounds of rosin and forty gallons of common fish or other fatty oil, or linseed-oil or other drying-oil, or any volatile oil. I then dilute the above in two hundred gallons of boiling water. The liquid thus prepared can be used in place of the usual drying-oil for grinding with crude colors, so as to produce paints of a superior quality at a cheap rate and capable of being thinned with water only.

To the above composition I occasionally add fifty pounds of sulphate of zinc or alum dissolved in water, not for the purpose of adding to the superiority of the paint, but in order to prevent the ravages of insects.

It will be observed that I am enabled to use common fish or other undrying oils as well as drying-oil—a circumstance which considerably reduces the expense of the paint.

I do not claim exclusively the use of watery solutions for mixing paints; but

What I claim, and desire to secure by Letters Patent, is—

The manufacture of paints by grinding crude colors in a composition of water, flour or its equivalent, rosin or its equivalent, fish-oil or any drying or undrying oil, in the proportions and manner substantially herein set forth, in order that the paint thus manufactured may be produced at a cheap rate and afterward thinned with water to the required consistency.

ISAAC GATTMAN.

Witnesses:
 HENRY HOWSON,
 CHARLES D. FREEMAN.